Patented May 9, 1939

2,157,727

UNITED STATES PATENT OFFICE 2,157,727

TREATMENT OF FABRICS TO PREVENT ROTTING

Ronald A. Baker, Los Angeles, Calif., assignor to Socony-Vacuum Oil Company, Incorporated, New York, N. Y., a corporation of New York No Drawing. Application September 24, 1938, Serial No. 231,575

4 Claims. (Cl. 21—4)

The object of the invention is to extend the life of cotton and linen fabrics exposed to the weather, such as tents and awnings, fishing lines and nets, and articles of similar character.

The invention contemplates the use of certain heavy metal salts of the naphthenic acids in an unstable aqueous ammoniacal solution which, on evaporation, leaves the salt in a water insoluble condition. Salts of zinc and copper are suitable for the purpose of the invention.

Ammonia forms complex ions with copper and zinc: $Cu(NH_3)_4^{++}$ and $Zn(NH_3)_4^{++}$, which are freely water soluble and exist only in aqueous solution. The petroleum naphthenic acids also form water soluble salts, ammonium naphthenates, with aqueous ammonia. When either of these complexes is mixed with ammonium naphthenate and the mixture is dehydrated, copper or zinc naphthenate is precipitated. This precipitate is completely insoluble in water and is soluble only with difficulty in concentrated aqueous ammonia. When precipitated on vegetable fibre in this manner, copper or zinc naphthenate is highly effective as a preservative agent.

To prepare the treating solution in concentrated form I prefer to use the following procedure. Zinc sulphate (for example) is dissolved in dilute ammonia hydroxide (say 15% strength) containing about 10% by volume of ethyl alcohol. The theoretical amount of a mixture of naphthenic acids (to form zinc naphthenate and calculated from the molecular weight of the acids used) is then added with gentle agitation, a clear solution being thus formed. Finally, it is desirable though not strictly necessary to add a wetting agent in small quantity, as for example from 0.1% to 0.3% by weight. This agent is preferably a sulfonated alcohol, e. g., lauric alcohol. Such products are available commercially under various names, "Alphosol T", "Intramine Y", "Orvus powder", etc.

The naphthenic acids should be selected mainly for their freedom from offensive odor. It is desirable that the acid number should lie between 160 and 250 mgm. KOH per gram, or that the molecular weight should lie between 350 and 220, though these are not absolute limitations. In place of zinc sulphate, copper sulphate or any water soluble salt of zinc or copper may be substituted.

The function of the alcohol in the above composition is to increase the solubility of the naphthenates and to decrease the ionization of the salts, thus cutting down the rate of evaporation of the ammonia (particularly after dilution for use) and thereby stabilizing the metallic complex up to the time it is used. An excess of ammonia is desirable, in order to take care of unavoidable loss by evaporation.

In following the above method for making the concentrated composition the following illustrative proportions may be used:

| | Per cent |
|---|---|
| Zinc sulphate, crystallized, 7 mols water | 4.58 |
| Naphthenic acids, acid number 190 | 8.95 |
| Ethyl alcohol | 10.00 |
| Ammonium hydroxide, 15% $NH_3$ | 76.37 to 76.17 |
| Wetting agent | 0.10 to 0.30 |

The concentrated composition produced will contain approximately 10% ammonium naphthenate. This is about the maximum strength desirable to make as the solutions tend to become too unstable at higher concentrations. A much larger proportion of water may be used if desired.

For use, the concentrate is preferably diluted so as to contain from 0.25% to 0.50% of the metal, though stronger solutions may be used if desired. The fabric is soaked in the diluted solution until completely saturated and then wrung out, drained, or centrifuged to remove excess solution, and is then allowed to become completely dry. In drying, the unstable double salt breaks down and water-insoluble copper or zinc naphthenate is precipitated throughout the fabric in a state of extreme subdivision. The impregnation of the fabric in this manner is much more nearly complete and is more uniform than when the fabric is treated with a solution of the heavy metal naphthenate in a volatile petroleum solvent. The accompanying ammonium sulphate may be washed out of the fabric, if desired, but only after the naphthenate has been precipitated on the fibre by drying.

By the above described treatment the life of the fabric may greatly be increased, by increasing its resistance both to dry rot and to the effects of exposure to the elements.

I claim as my invention:

1. The method of prolonging the life of fabrics composed of vegetable fibre which comprises: immersing said fabrics in an aqueous solution containing an ammonium naphthenate of a heavy metal selected from the group consisting of copper and zinc, and precipitating the heavy metal naphthenate on the fibre by drying the fabric after said immersion.

2. A method as in claim 1 in which an aliphatic alcohol of low molecular weight is added to said aqueous solution.

3. A method as in claim 1 in which a wetting agent for vegetable fibre is added to said solution.

4. A method as in claim 1 including an additional step of washing water-soluble salts out of said fabric after said drying step.

RONALD A. BAKER.